United States Patent
Tao et al.

(10) Patent No.: US 11,106,034 B2
(45) Date of Patent: Aug. 31, 2021

(54) ADJUSTMENT MECHANISM FOR HEAD-MOUNTED DISPLAY

(71) Applicant: Apple Inc., Cupertino, CA (US)

(72) Inventors: Jia Tao, Santa Clara, CA (US); Aidan N. Zimmerman, Sunnyvale, CA (US); Phil M. Hobson, Menlo Park, CA (US); Jeremy C. Franklin, San Francisco, CA (US); Ivan S. Maric, Sunnyvale, CA (US); Jason C. Sauers, Sunnyvale, CA (US); Jan K. Quijalvo, Mississauga (CA); Eric N. Vergo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/845,581

(22) Filed: Apr. 10, 2020

(65) Prior Publication Data

US 2020/0355919 A1    Nov. 12, 2020

Related U.S. Application Data (60) Provisional application No. 62/844,244, filed on May 7, 2019.

(51) Int. Cl.
   *G02B 27/01*    (2006.01)
(52) U.S. Cl.
   CPC ..... *G02B 27/0149* (2013.01); *G02B 27/0172* (2013.01); *G02B 2027/0154* (2013.01)
(58) Field of Classification Search
   CPC ............ G02B 27/0149; G02B 27/0172; G02B 2027/0154
   See application file for complete search history.

(56) References Cited

U.S. PATENT DOCUMENTS

| 2,857,776 A | 10/1958 | Williams et al. |
| 5,937,702 A | 8/1999 | Erikson et al. |
| 5,954,642 A * | 9/1999 | Johnson ............... G02B 27/017 600/300 |

(Continued)

FOREIGN PATENT DOCUMENTS

| CN | 103852891 A | 6/2014 |
| CN | 104158433 A | 11/2014 |

(Continued)

OTHER PUBLICATIONS

International Search Report and Written Opinion issued in co-pending International Application No. PCT/US2020/026134 dated Jul. 15, 2020 (14 pp).

(Continued)

*Primary Examiner* — Nitin Patel
*Assistant Examiner* — Robert M Stone
(74) *Attorney, Agent, or Firm* — Young Basile Hanlon & MacFarlane, P.C.

(57) ABSTRACT

A head-mounted display includes an optical assembly and an actuator. The actuator includes a movement mechanism configured to adjust a position of an optical component within the optical assembly, a locking-release mechanism configured to modify operation of the movement mechanism upon detection of a dynamic event, and a dampening mechanism configured to control positional changes of the optical component during the dynamic event.

20 Claims, 8 Drawing Sheets

(56) References Cited

U.S. PATENT DOCUMENTS

| | | | |
|---|---|---|---|
| 6,202,500 B1 | 3/2001 | Erikson et al. | |
| 6,204,974 B1* | 3/2001 | Spitzer | G02B 27/017 359/630 |
| 6,415,673 B1 | 7/2002 | Erikson et al. | |
| 6,480,174 B1* | 11/2002 | Kaufmann | G02B 27/0172 345/7 |
| 7,059,182 B1* | 6/2006 | Ragner | H05K 5/0086 73/200 |
| 8,355,208 B1* | 1/2013 | Baker | G02B 27/0176 359/630 |
| 8,413,532 B2 | 4/2013 | Wu | |
| 8,659,433 B2* | 2/2014 | Petrou | G06F 21/32 340/573.1 |
| 9,651,788 B2 | 5/2017 | Osterhout et al. | |
| 9,733,480 B2* | 8/2017 | Baek | H05K 5/0004 |
| 10,386,647 B1* | 8/2019 | Yu | G02B 27/02 |
| 2001/0055947 A1 | 12/2001 | McCabe | |
| 2004/0003453 A1* | 1/2004 | Urakawa | G02B 27/0176 2/422 |
| 2008/0042038 A1 | 2/2008 | Pombo | |
| 2008/0186445 A1 | 8/2008 | Van Atta et al. | |
| 2009/0159408 A1* | 6/2009 | Sunder | G11B 19/043 200/61.45 R |
| 2011/0213664 A1 | 9/2011 | Osterhout et al. | |
| 2013/0022220 A1* | 1/2013 | Dong | H04R 1/1066 381/151 |
| 2013/0069787 A1* | 3/2013 | Petrou | G02B 27/017 340/573.1 |
| 2013/0346168 A1 | 12/2013 | Zhou et al. | |
| 2014/0098009 A1 | 4/2014 | Prest et al. | |
| 2014/0232619 A1* | 8/2014 | Hiraide | G02B 1/045 345/8 |
| 2015/0103306 A1* | 4/2015 | Kaji | G02C 5/08 351/128 |
| 2016/0147070 A1 | 5/2016 | Border et al. | |
| 2016/0266412 A1 | 9/2016 | Yoshida | |
| 2016/0320612 A1* | 11/2016 | Zhang | G02B 27/017 |
| 2016/0357020 A1* | 12/2016 | Hwang | G02B 27/0176 |
| 2016/0363773 A1* | 12/2016 | Tempel | G02B 27/0176 |
| 2016/0370590 A1* | 12/2016 | Fujishiro | G02B 27/0176 |
| 2017/0344114 A1 | 11/2017 | Osterhout et al. | |
| 2018/0157043 A1 | 6/2018 | Yi et al. | |
| 2018/0203505 A1 | 7/2018 | Trail et al. | |
| 2018/0283741 A1* | 10/2018 | Bei | F16F 15/022 |
| 2018/0335605 A1* | 11/2018 | Chou | G02B 27/0176 |
| 2018/0338130 A1* | 11/2018 | Miller | G02B 27/0176 |
| 2019/0285894 A1* | 9/2019 | Tian | G05G 5/06 |
| 2020/0093200 A1 | 3/2020 | Mohapatra | A41D 13/0155 |
| 2020/0371360 A1* | 11/2020 | Dalrymple | G02B 7/06 |
| 2021/0141212 A1* | 5/2021 | Jacoby | G02B 26/0891 |

FOREIGN PATENT DOCUMENTS

| | | | | |
|---|---|---|---|---|
| CN | 104898277 | A | | 9/2015 |
| CN | 204883054 | U | | 12/2015 |
| CN | 105319717 | A | | 2/2016 |
| CN | 205581416 | U | | 9/2016 |
| CN | 205581421 | U | | 9/2016 |
| CN | 106444025 | A | | 2/2017 |
| CN | 206057681 | U | | 3/2017 |
| CN | 206096621 | U | | 4/2017 |
| CN | 206133119 | U | | 4/2017 |
| CN | 106950694 | A | | 7/2017 |
| CN | 206321880 | U | | 7/2017 |
| CN | 107577052 | A | | 1/2018 |
| CN | 206863342 | U | | 1/2018 |
| CN | 206960775 | | * | 2/2018 |
| CN | 206960775 | U | * | 2/2018 |
| CN | 207440403 | | * | 6/2018 |
| CN | 207440403 | U | * | 6/2018 |
| CN | 207752244 | U | | 8/2018 |
| CN | 209148977 | | * | 7/2019 |
| CN | 209148977 | U | * | 7/2019 |
| EP | 3139251 | A1 | | 3/2017 |
| EP | 3441811 | A1 | | 2/2019 |
| FR | 2894683 | A1 | | 6/2007 |
| JP | 5126682 | B2 | * | 1/2013 ......... G02B 27/0176 |
| KR | 101455714 | B1 | | 11/2014 |
| WO | WO-2010067758 | A1 | * | 6/2010 ......... G02B 27/0176 |
| WO | 2018213010 | A1 | | 11/2018 |

OTHER PUBLICATIONS

Reddit.com, Author Unknown, Posted by u/macegr 4 years ago, "Made some magnetic quick-change prescription lens adapters for DK2", https://www.reddit.com/r/oculus/comments/2t5b9u/made_some_magnetic_quickchange_prescription_lens/, Downloaded Jun. 13, 2019 (3 pp).

Vive Report, Author: dgtlhrt, "Fresh Eyes: A Story of Clarity, Comfort & VR Lens Lab", Sep. 17, 2017, https://vivereport.com/2017/09/27/fresh-eyes-a-story-of-clarity-comfort-vr-lens-lab/, (6 pp).

VR Cover, Author Unknown, "VR Lens Lab, Prescription Lenses in VR", Downloaded Jun. 13, 2019, https://vrcover.com/prescription-lenses-in-vr/ (3 pp).

VR Lens Lab, Posted by Jay, "Free spacer for your Oculus Rift adapter and new RABS lens technology with minimal distortions", https://vr-lens-lab.com/oculus-rift-spacer-and-rabs-lens-technolohy/, Oct. 10, 2016 (4 pp).

International Search Report and Written Opinion in co-pending International Patent Application No. PCT/US2019/051077 dated Nov. 26, 2019 (12 pp).

International Search Report and Written Opinion in co-pending International Application No. PCT/US2020/038438 dated Sep. 9, 2020 (14 pp).

* cited by examiner

ADJUSTMENT MECHANISM FOR HEAD-MOUNTED DISPLAY

CROSS-REFERENCE TO RELATED APPLICATION(S)

This application claims the benefit of U.S. Provisional Application No. 62/844,244, filed on May 7, 2019. The content of the foregoing application is incorporated herein by reference in its entirety for all purposes.

TECHNICAL FIELD

This disclosure relates to a display system and, in particular, a head-mounted display and an adjustment mechanism therefor.

BACKGROUND

Head-mounted displays (HMD) are electronic devices that display graphics to a user wearing the head-mounted display, for example, when participating in activities related to computer-generated, augmented, virtual, and/or mixed realities. The head-mounted display may be worn by users having differing head sizes and facial features, so the ability to adjust a fit of the head-mounted display for a particular user having specific features is a high priority. Existing head-mounted displays can be adjusted for circumferential fit using features such as headbands made from elastic materials and temple-located adjustment mechanisms that change a length of a non-elastic headband between a variety of predetermined lengths. However, these adjustment options do not address differences in facial features, such as different inter-pupillary distances (IPD) among users.

SUMMARY

Disclosed herein are implementations of a head-mounted display and adjustment mechanisms for optical components within the head-mounted display.

A head-mounted display includes an optical assembly and an actuator. The actuator includes a movement mechanism configured to adjust a position of an optical component within the optical assembly, a locking-release mechanism configured to modify operation of the movement mechanism upon detection of a dynamic event, and a dampening mechanism configured to control positional changes of the optical component during the dynamic event.

A method includes detecting, using a sensor in a head-mounted display, a start of a dynamic event. In accordance with detection of the start of the dynamic event and using a locking-release mechanism, the method includes modifying operation of a movement mechanism. The movement mechanism is configured to adjust a position of an optical component within an optical assembly of the head-mounted display. The method includes detecting, using the sensor in the head-mounted display, an end of the dynamic event. In accordance with detection of the end of the dynamic event and using the movement mechanism, the method includes adjusting the position of the optical component within the optical assembly to a pre-dynamic event position.

An actuator includes a movement mechanism configured to adjust a position of an optical component within an optical assembly of a head-mounted display. The movement mechanism includes a lead screw and a threaded component. The threaded component is configured to translate along the lead screw based on rotation of the lead screw. The actuator also includes a locking-release mechanism configured to modify operation of the movement mechanism upon detection of a dynamic event. The locking-release mechanism includes a spring configured to bias the threaded component against the lead screw. Modified operation of the movement mechanism includes the threaded component being disengaged from the lead screw. The actuator also includes a dampening mechanism configured to control positional changes of the movement mechanism during the dynamic event.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

For improved performance, head-mounted displays require the alignment of optical components such as lenses, projection units, displays, screens, etc. to unique facial features among a variety of users in order to promote comfort, fit, performance, etc. During the alignment process, optical components can be physically repositioned in respect to other components within a head-mounted display. As packaging space is constrained within head-mounted displays, physical repositioning mechanisms should be small in size with tightly controlled motion, for example, small electro-mechanical actuators. Though small in size, the actuators should be able to withstand dynamic events and properly function after experiencing these dynamic events.

Dynamic events can include shaking, jostling, dropping, impacting, or otherwise handling the head-mounted display in a manner that leads to forces being exerted upon optical components or subcomponents within the electro-mechanical actuators.

In an example where an actuator used to reposition optical components employs a lead screw, locking-release mechanisms that allow disengagement or slip along the lead screw can be used in conjunction with dampening mechanisms that allow controlled sliding and/or stopping along a guide rail to prevent damage both to the actuator and to the optical components that undergo motion through use of the actuator. The locking-release and dampening mechanisms can include motor-driven, lead-screw system designs that leverage linear spring-loaded nut assemblies, torsional spring-loaded plates, drop-detection-based lock engagement or disengagement, and optical-component motion dampening during dynamic events. Detailed descriptions of these and other applicable mechanisms that improve performance of physical repositioning within a head-mounted display are described herein.

Figure 1:
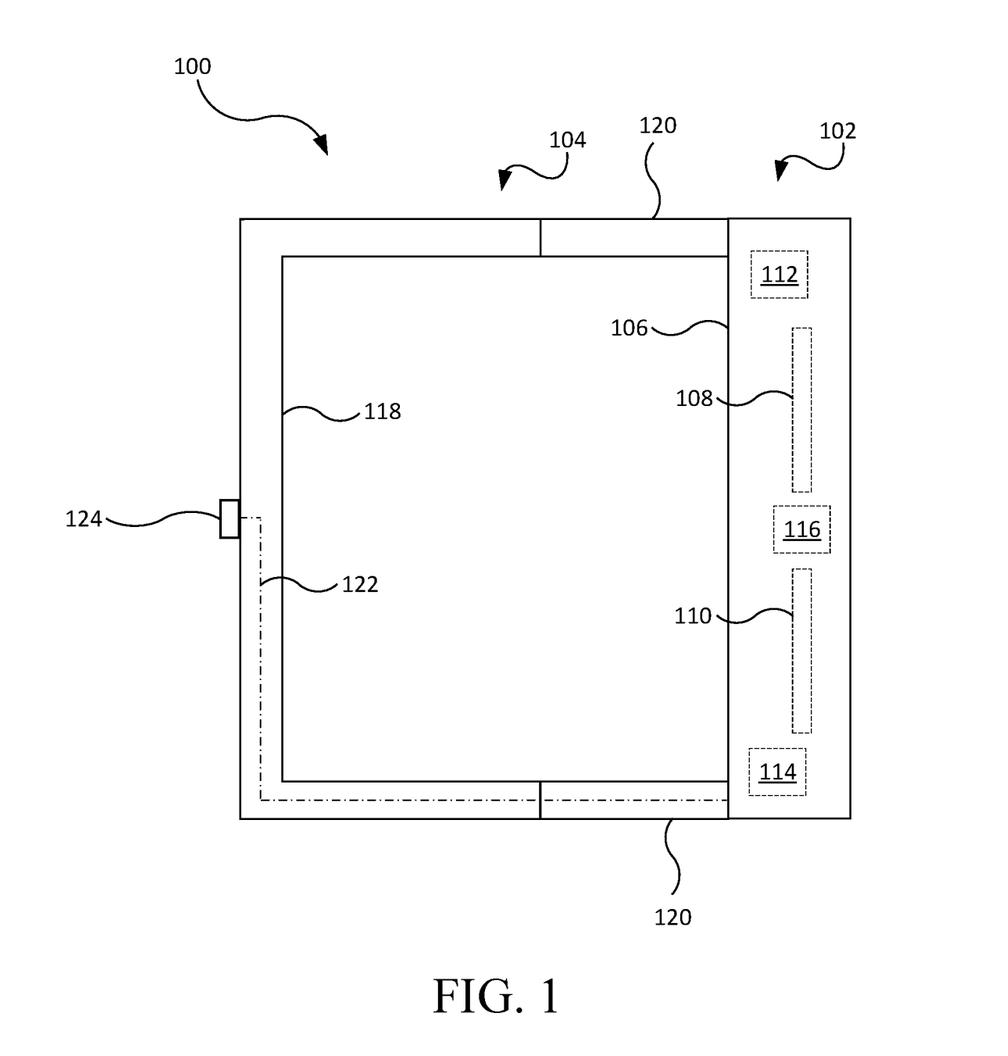
FIG. 1 is a top view of a head-mounted display.

FIG. 1 is a top view of a head-mounted display 100 that includes a display assembly 102 and a head support 104. The display assembly 102 can include a housing 106 and various sub-assemblies and electronics therein, such as one or more optical assemblies 108, 110, sensors 112 (e.g., detecting gaze and/or user status), power electronics 114, and actuators 116. Various portions or subcomponents of the optical assemblies 108, 110 (e.g., such as lenses, projection units, screens, or displays) can be repositionable using the one or more actuators 116, details of which are described further herein. The optical assemblies 108, 110, sensors 112, power electronics 114, and actuators 116 are depicted schematically and in dashed lines to illustrate being hidden from view and disposed within the display assembly 102.

The head support 104 is coupled to left and right sides of the display assembly 102 (e.g., to the housing 106), extending rearward of the display assembly 102 and between the left and right sides thereof. When the head-mounted display 100 is worn on a head of a user, the display assembly 102 extends across a front of the head of the user (i.e., the face of the user), while the head support 104 extends rearward along left and right sides of the head of the user and across a rear of the head of the user. Thus, the display assembly 102 and the head support 104 cooperatively extend around the head of the user. The head support 104 includes a band 118 and one or more circumferential adjustment mechanisms 120 (e.g., two as shown on the left and right sides)

The band 118 forms a primary portion of the head support 104, which engages the head of the user to support the head-mounted display 100 worn on the head of the user. Each of the circumferential adjustment mechanisms 120 removably couples the head support 104 to the display assembly 102 and allows the head support 104 to change length overall by changing the length between the band 118 and the circumferential adjustment mechanisms 120. Though two circumferential adjustment mechanisms 120 are shown as acting from opposing sides of the head support 104, the head support 104 may alternatively employ a single adjustment mechanism.

The band 118 can be elastic, flexible, or otherwise deformable to accommodate different shapes of heads of the users. The band 118 can be formed of or otherwise include an elastic or silicone material. The band 118 may also be configured to transfer electrical power from a power source (e.g., an external battery) to the display assembly 102. For example, the band 118 may include a flexible circuit 122 extending from a power connector 124, through the circumferential adjustment mechanism 120, to a corresponding power connector (not shown) of the display assembly 102. The flexible circuit 122 (hidden and illustrated in dash-dot lines) may be embedded in the elastic or silicone material of the band 118 or otherwise hidden from view by the material of the band 118. In this manner, the band 118 may supply electrical current to the display assembly 102 inclusive of the optical assemblies 108, 110, sensors 112, power electronics 114, and actuators 116.

Figure 2A:
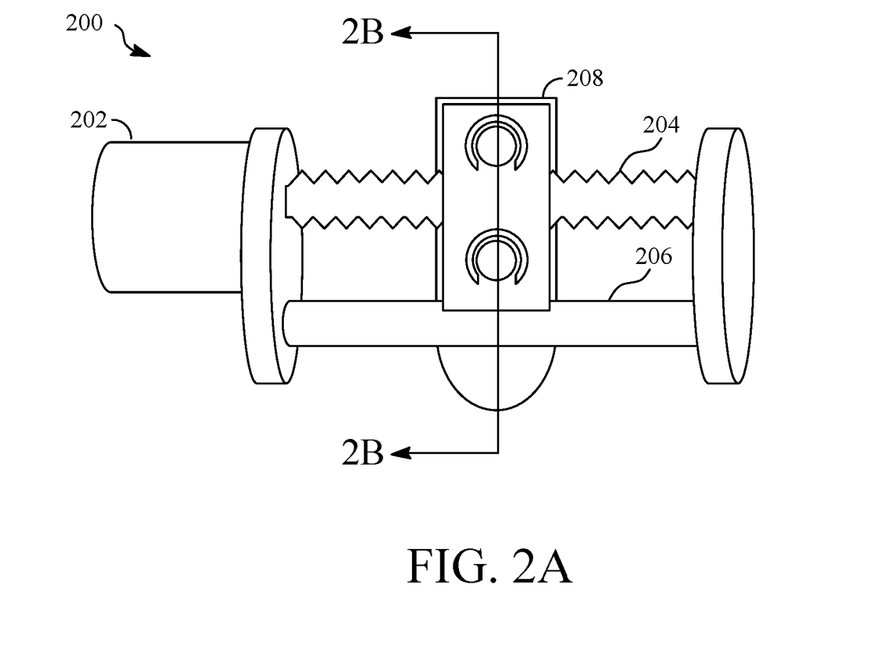
FIG. 2A is a detail view of an actuator disposed within a head-mounted display similar to the head-mounted display of FIG. 1.
Figure 2B:
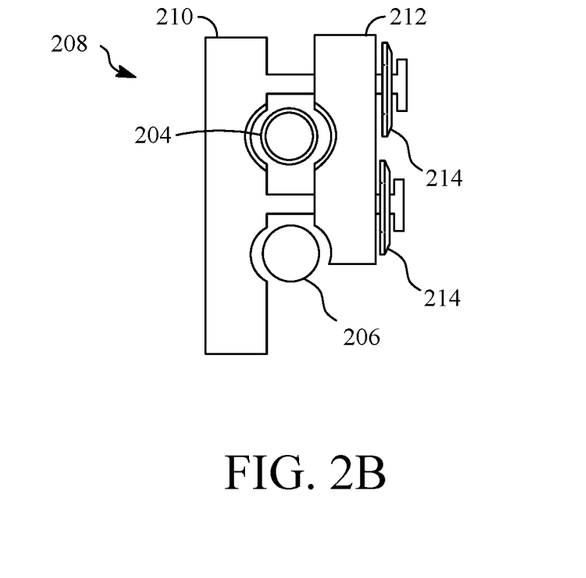
FIG. 2B is a partially-exploded sectional view of the actuator of FIG. 2A.

FIGS. 2A and 2B are detail and partially-exploded sectional views of an actuator 200. The partially-exploded sectional view of FIG. 2B is representative of the location indicated in FIG. 2A. The actuator 200 may serve as the actuator 116 disposed in the head-mounted display 100 of FIG. 1.

The actuator 200 includes a movement mechanism formed by a motor 202, a lead screw 204, a guide rail 206, and a nut assembly 208. The nut assembly 208 is configured to translate along the lead screw 204 based on rotation of the lead screw 204 and thread engagement between the nut assembly 208 and the lead screw 204. For example, the lead screw 204 can be rotationally driven by the motor 202 to cause translation of the nut assembly 208. In this manner, the movement mechanism is configured to adjust a position of an optical component (e.g., a lens, a display, a projector, a screen, a lens and a display, etc., not shown) within an optical assembly (e.g., within the optical assemblies 108, 110 within the head-mounted display 100). The threads on the lead screw 204, the threads on the nut assembly 208, or both, can be coated to provide a longer life for the actuator 200 and to reduce friction and noise associated with operation of the actuator 200.

Positional adjustment of optical component(s) can be achieved using the described movement mechanism, for example, by coupling the optical component(s) that require(s) repositioning to a portion of the nut assembly 208, though the coupling is not shown. The movement mechanism can be used to modify optical component spacing along a focal axis or modify interpupillary distance, for example, between optical assemblies within the same head-mounted display. The nut assembly 208 can be designed to avoid unintended rotation, for example, by use of the guide rail 206 extending parallel to the lead screw 204, though other anti-rotation features in the actuator 200 are also possible. When the guide rail 206 is used as shown in FIGS. 2A and 2B, the nut assembly 208 translates along both the lead screw 204 and the guide rail 206 based on rotation of the lead screw 204 as driven by the motor 202.

The actuator 200 also includes a locking-release mechanism formed by separable halves or portions 210, 212 of the nut assembly 208 and one or more springs 214 that can linearly bias the portion 212 against the lead screw 204, against the guide rail 206, and against the portion 210 of the nut assembly 208 as is best seen in the partially-exploded sectional view of FIG. 2B. In this example, the nut assembly 208 has a split-nut configuration with the portion 212 of the nut assembly 208 configured to translate away from the portion 210 of the nut assembly 208 when a load experienced is sufficient to overcome a load generated by the springs 214 against the portion 212 of the nut assembly 208. Sufficient loads of this type can occur during dynamic events (e.g., shaking, jostling, dropping, or impacting a head-mounted display that includes the actuator 200).

During a dynamic event that generates sufficient force, the threads on the lead screw 204 and the threads on the portions 210, 212 can be disengaged, and the nut assembly 208 becomes free to slide along the lead screw 204 and the guide rail 206, thus limiting or avoiding damage to the nut assembly 208 and/or to the lead screw 204 during the dynamic event based on operation of the described locking-release mechanism. After a dynamic event, when sufficient loads are no longer experienced by the actuator 200, the threads on the lead screw 204 and the threads on the portions 210, 212 of the nut assembly 208 can become reengaged, and the nut assembly 208 can once again be driven along the lead screw 204 by the motor.

Upon reengagement, the nut assembly 208 may be in a different position along the lead screw 204 than prior to or during the dynamic event. In this case, the movement mechanism may be configured to adjust the position of the nut assembly 208, and in turn, any optical components coupled or otherwise connected to the nut assembly 208, to a pre-dynamic event position, that is, to a position that was documented for the nut assembly 208 in respect to the lead screw 204 prior to the dynamic event. Though both portions 210, 212 of the nut assembly 208 are shown as being threaded at the interface to the lead screw 204, in some examples, only the portion 212 may include threads without impacting operation of the actuator 200.

To effectively implement the locking-release mechanism of the actuator 200, a position sensor (not shown) can be used to determine a position of the nut assembly 208 in respect to the lead screw 204 before, during, and after a dynamic event. An accelerometer, inertial measurement unit, or any other sensor (not shown) can be used to determine a beginning, duration, and end of the dynamic event. In another example, a magnetic encoder system can include a sensor that determines a landing position of the portions 210, 212 of the nut assembly 208 in respect to the lead screw 204 (or other portion of the actuator 200), and a controller can perform a recalibration, repositioning the portions 210, 212 of the nut assembly 208 to pre-dynamic event positions along the lead screw 204 after the dynamic event.

Figure 3A:
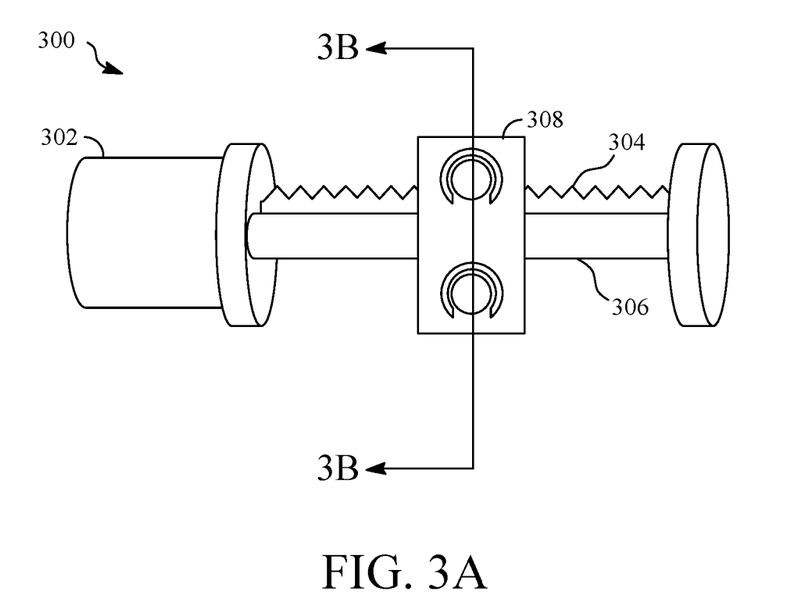
FIG. 3A is a detail view of another actuator disposed within a head-mounted display similar to the head-mounted display of FIG. 1.
Figure 3B:
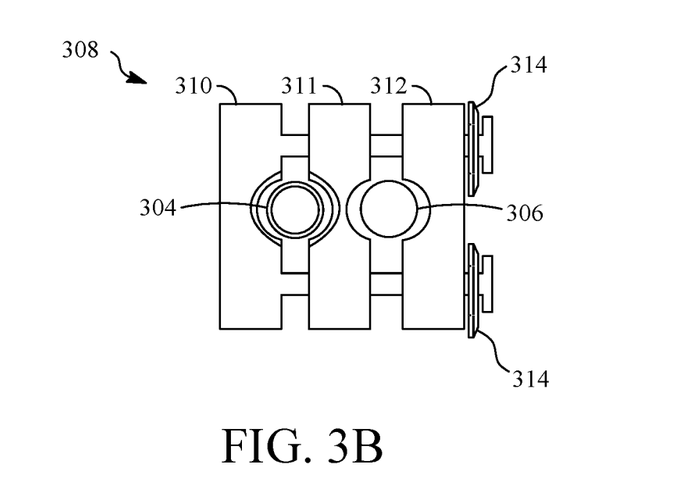
FIG. 3B is a partially-exploded sectional view of the actuator of FIG. 3A.

FIGS. 3A and 3B are detail and partially-exploded sectional views of another actuator 300. The partially-exploded sectional view of FIG. 3B is representative of the location indicated in FIG. 3A. The actuator 300 may serve as the actuator 116 disposed in the head-mounted display 100 of FIG. 1 and may be similar to the actuator 200 described in respect to FIGS. 2A and 2B. Differences between the actuator 300 and the actuator 200 are highlighted herein.

The actuator 300 includes a movement mechanism formed by a motor 302, a lead screw 304, a guide rail 306, and a nut assembly 308. The nut assembly 308 is configured to translate along the lead screw 304 and the guide rail 306 based on rotation of the lead screw 304 and thread engagement between the nut assembly 308 and the lead screw 304. The nut assembly 308 can be designed to avoid unintended rotation, for example, by use of the guide rail 306 extending parallel to the lead screw 304, though other anti-rotation features in the actuator 300 are also possible.

The actuator 300 also includes a locking-release mechanism formed by separable portions 310, 311, 312 of the nut assembly 308 and one or more springs 314 that can linearly bias the portion 312 against the guide rail 306 and the central-most portion 311 of the nut assembly 308. In turn, the portion 311 can be linearly biased against the lead screw 304 and the portion 310 of the nut assembly 308 as is best seen in the partially-exploded sectional view of FIG. 3B. In this example, the nut assembly 308 has three portions 310, 311, 312, with the portions 311, 312 of the nut assembly 208 configured to translate away and become disengaged from the portion 310 of the nut assembly 308 when a load experienced is sufficient to overcome a load generated by the springs 314 against the portion 312 of the nut assembly 208. Sufficient loads of this type can occur during dynamic events (e.g., shaking, jostling, dropping, or impacting a head-mounted display that includes the actuator 300).

The actuator 300 of FIGS. 3A and 3B differs from the actuator 200 of FIGS. 2A and 2B in that the nut assembly 308 is used in place of the nut assembly 208. The actuator 300 of FIGS. 3A and 3B may be useful in vertically tight packaging spaces, that is, the actuator 300 may be shorter in height than the actuator 200 due to the construction of the nut assemblies 208, 308. In comparison, the actuator 200 of FIGS. 2A and 2B may be useful in horizontally tight packaging spaces, that is, the actuator 200 may be narrower in width than the actuator 300 due to the construction of the nut assemblies 208, 308.

Figure 4A:
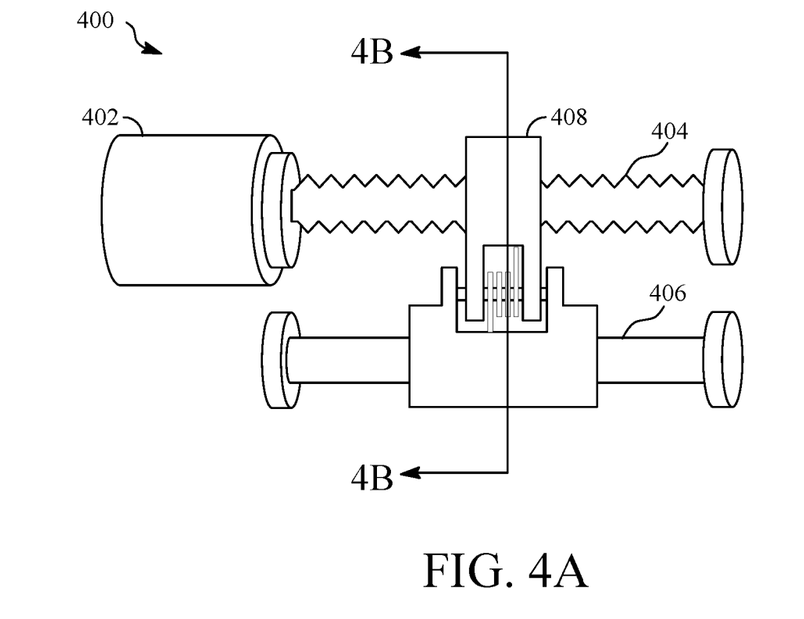
FIG. 4A is a detail view of another actuator disposed within a head-mounted display similar to the head-mounted display of FIG. 1.
Figure 4B:
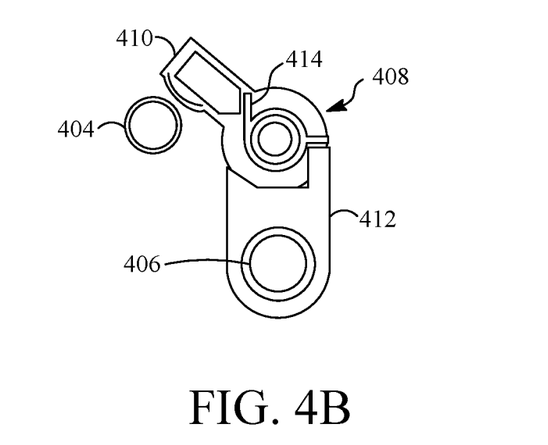
FIG. 4B is a partially-exploded sectional view of the actuator of FIG. 4A.

FIGS. 4A and 4B are detail and partially-exploded sectional views of another actuator 400. The partially-exploded sectional view of FIG. 4B is representative of the location indicated in FIG. 4A. The actuator 400 may serve as the actuator 116 disposed in the head-mounted display 100 of FIG. 1 and may be similar to the actuators 200, 300 described in respect to FIGS. 2A, 2B, 3A, and 3B. Differences between the actuator 400 and the actuators 200, 300 are highlighted herein.

The actuator 400 includes a movement mechanism formed by a motor 402, a lead screw 404, a guide rail 406, and a torsion assembly 408. The torsion assembly 408 is configured to translate along the lead screw 404 and the guide rail 406 based on rotation of the lead screw 404 and thread engagement between the torsion assembly 408 and the lead screw 404. The torsion assembly 408 can be designed to avoid unintended rotation, for example, by use of the guide rail 406 extending through the torsion assembly 408, though other anti-rotation features in the actuator 400 are also possible.

The torsion assembly 408 includes a plate 410, a support 412, and a torsional spring 414 that can torsionally bias the plate 410 against the lead screw 404 to form a locking-release mechanism of the actuator 400. In this example, the torsional spring 414 acts against both the plate 410 and the support 412 such that the plate 410 is configured to rotate away and become disengaged from the lead screw 404 when a load experienced is sufficient to overcome a load generated by the spring 414 against the plate 410 and the support 412. Sufficient loads of this type can occur during dynamic events (e.g., shaking, jostling, dropping, or impacting a head-mounted display that includes the actuator 400).

The actuator 400 of FIGS. 4A and 4B differs from the actuators 200, 300 of FIGS. 2A, 2B, 3A, and 3B in that the torsion assembly 408 with the rotatable plate 410 is used in place of the nut assemblies 208, 308. Use of the actuator 400 of FIGS. 4A and 4B can support unique positional relationships between the lead screw 404 and the guide rail 406 since these components can be both vertically and horizontally offset while remaining generally parallel. Further, there is less physical engagement between the plate 410 and the lead screw 404 than is present between the nut assemblies 208, 308 and the lead screws 204, 304, reducing for example, friction-based and wear-based failure potential.

The actuators 200, 300, 400 described in respect to FIGS. 2A, 2B, 3A, 3B, 4A, and 4B include split-nut and torsional-type movement mechanisms using lead screws 204, 304, 404. Additional designs for movement mechanisms can include living-hinge nut assemblies and back-driveable lead screws (not shown). For example, a living-hinge nut assembly can be separated along a central axis with coupled top and bottom edges such that the sides of the nut assembly disengage from the lead screw under sufficient force while the top and bottom edges remain coupled. In another example, a back-driveable lead screw can be controlled to reduce forces experienced during a dynamic event by enabling back-driving during the dynamic event. In addition, movement mechanisms may use rack-and-pinion, pneumatic, hydraulic, piezo-actuated, and electromagnetic designs (not shown) to achieve positioning and repositioning of optical components within optical assemblies.

A consequence of using the locking-release mechanisms described in respect to FIGS. 2A, 2B, 3A, 3B, 4A, and 4B is that the nut assemblies 208, 308 and torsion assembly 408 can become generally free-sliding along the guide rails 206, 306, 406 during a dynamic event sufficient to disengage the nut assemblies 208, 308 and torsion assembly 408 from the lead screws 204, 304, 404. To avoid damage to optical components having motion controlled by the actuators 200, 200, 400, various dampening mechanisms can be implemented to control positional changes of the otherwise free-sliding optical components during dynamic events.

Figure 5A:
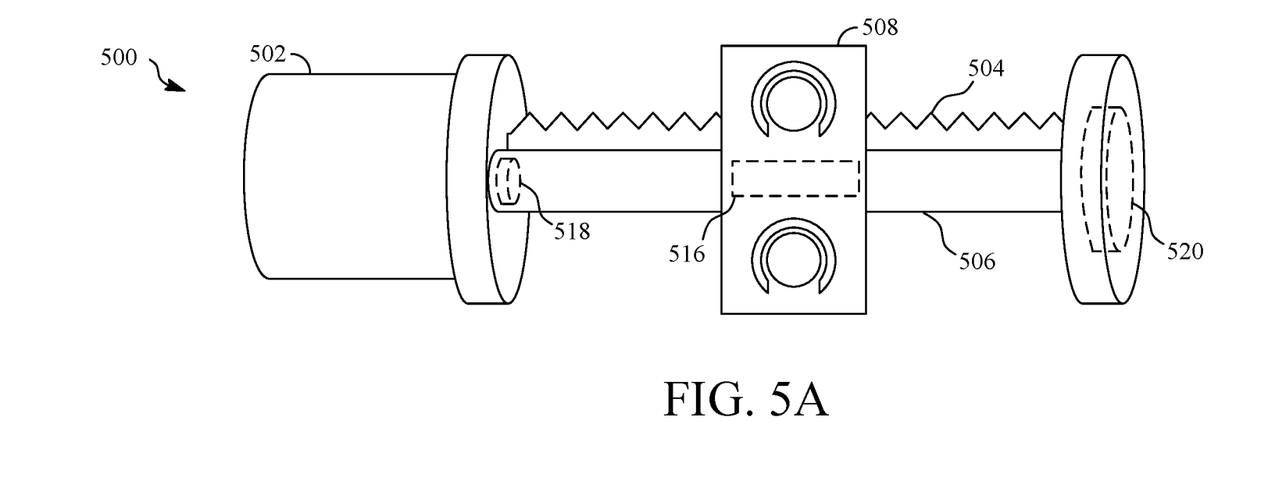
FIG. 5A is a detail view of an electromagnetic dampening mechanism for an actuator similar to the actuators of FIGS. 2A, 2B, 3A, 3B, 4A, and 4B.
Figure 5B:
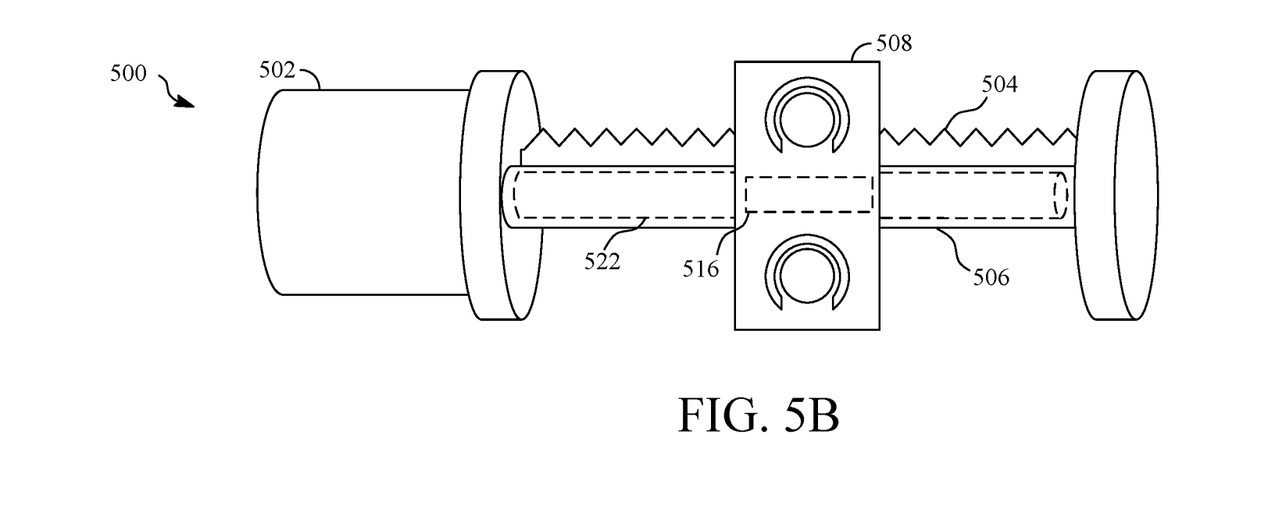
FIG. 5B is a detail view of another electromagnetic dampening mechanism for an actuator similar to the actuator of FIGS. 2A, 2B, 3A, 3B, 4A, and 4B.

FIGS. 5A and 5B are detail views of magnetic dampening mechanisms for an actuator 500 similar to the actuators 200, 300, 400 of FIGS. 2A, 2B, 3A, 3B, 4A, and 4B. The actuator 500 may serve as the actuator 116 disposed in the head-mounted display 100 of FIG. 1. The actuator 500 includes a movement mechanism formed by a motor 502, a lead screw 504, a guide rail 506, and a nut assembly 508. The nut assembly 508 is configured to translate along the lead screw 504 and the guide rail 506 based on rotation of the lead screw 504 and thread engagement between the nut assembly 508 and the lead screw 504.

Locking-release mechanisms similar to those described in reference to FIGS. 2A, 2B, 3A, and 3B, can cause the nut assembly 508 to become disengaged from the lead screw 504, for example, during a dynamic event. To minimize free sliding of the nut assembly 508, the actuator 500 can include an electromagnetic dampening mechanism formed by an electromagnetic component 516 disposed within or forming a portion of the nut assembly 508 as shown in dotted line in FIGS. 5A and 5B.

Referring to FIG. 5A, the electromagnetic dampening mechanism can include electromagnetic components 518, 520 disposed at ends of the guide rail 506 as shown in dotted line for hidden representation. In this embodiment, the electromagnetic components 518, 520 can be controlled to actuate and repel the electromagnetic component 516 during a dynamic event, thus serving as cushions or bumpers to slow or prohibit the nut assembly 508 from impacting the ends of the guide rail 506 when sliding. In other embodiments, the nut assembly 508 may include portions formed of ferritic or other material susceptible to magnetic repulsion, and the nut assembly 508 may be repelled by the electromagnetic components 518, 520 during dynamic events.

Referring to FIG. 5B, the electromagnetic dampening mechanism can include electromagnetic component 522 that runs the length of the guide rail 506 as shown in dotted line. In this embodiment, the electromagnetic component 522 can be controlled to actuate and attract the electromagnetic component 516 during a dynamic event, thus serving to slow motion of the nut assembly 508 during the dynamic event due to attraction between the electromagnetic components 516, 522. In other embodiments, the guide rail 506 may be formed of ferritic or other material susceptible to magnetic attraction, and the electromagnetic component 516 may be attracted to the guide rail 506 during dynamic events.

Other magnetic dampening mechanisms are also possible. For example, the electromagnetic components 516, 518, 520, 522 may be designed to repel in non-powered states and attract in powered states (or vice-versa), and some of the electromagnetic components 516, 518, 520, 522 may be replaced with non-powered ferritic or other magnetically-susceptible materials without changing the overall function of the dampening mechanism.

Figure 6A:
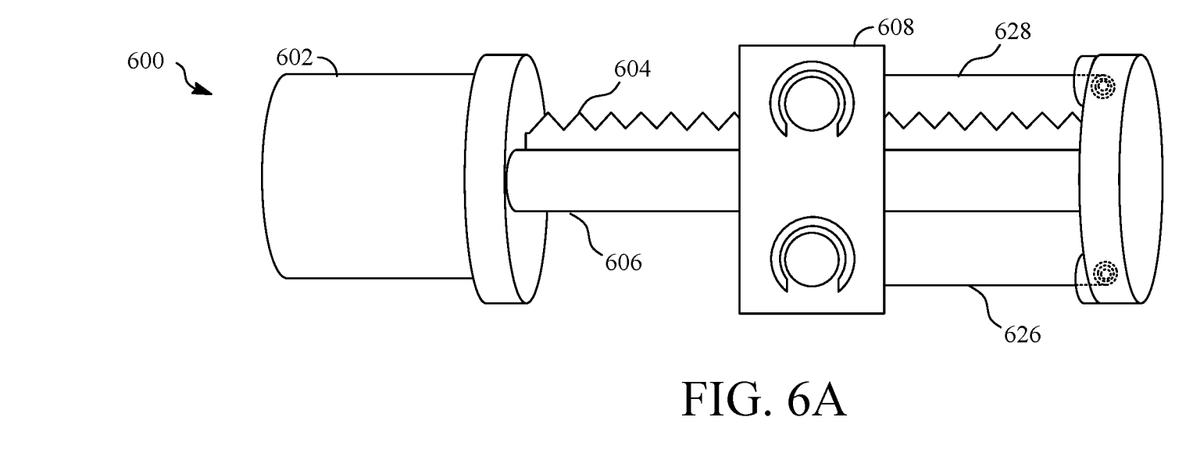
FIG. 6A is a detail view of a mechanical dampening mechanism for an actuator similar to the actuator of FIGS. 2A, 2B, 3A, 3B, 4A, and 4B.
Figure 6B:
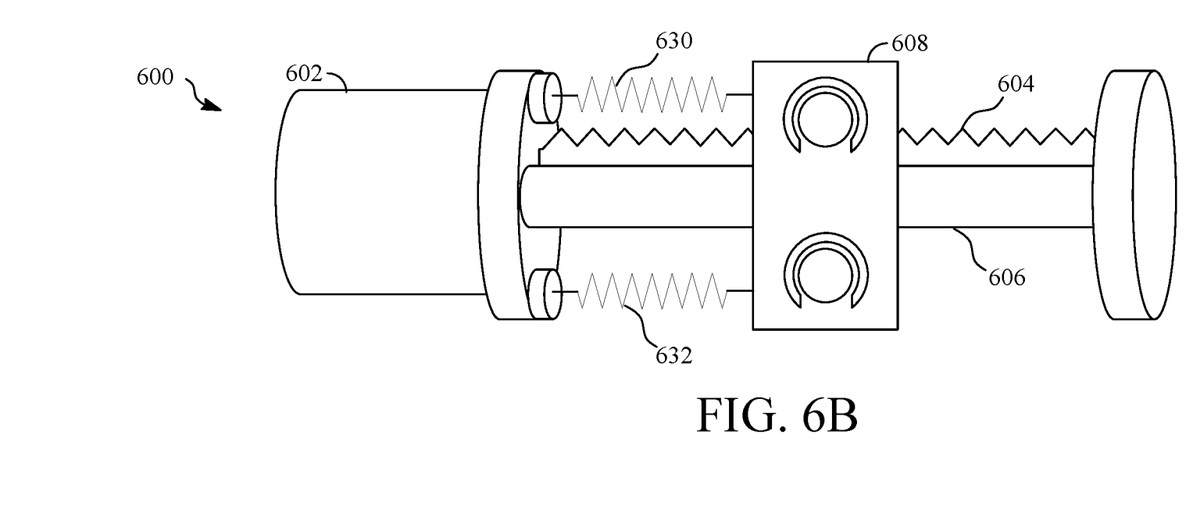
FIG. 6B is a detail view of another mechanical dampening mechanism for an actuator similar to the actuator of FIGS. 2A, 2B, 3A, 3B, 4A, and 4B.

FIGS. 6A and 6B are detail views of mechanical dampening mechanisms for an actuator 600 similar to the actuators 200, 300, 500 of FIGS. 2A, 2B, 3A, 3B, 5A, and 5B. The actuator 600 may serve as the actuator 116 disposed in the head-mounted display 100 of FIG. 1. The actuator 600 includes a movement mechanism formed by a motor 602, a lead screw 604, a guide rail 606, and a nut assembly 608. The nut assembly 608 is configured to translate along the lead screw 604 and the guide rail 606 based on rotation of the lead screw 604 and thread engagement between the nut assembly 608 and the lead screw 604.

Locking-release mechanisms similar to those described in reference to FIGS. 2A, 2B, 3A, and 3B can cause the nut assembly 608 to become disengaged from the lead screw 604, for example, during a dynamic event. To minimize free sliding of the nut assembly 608, the actuator 600 can include a mechanical dampening mechanism such as those described in reference to FIGS. 6A and 6B.

Referring to FIG. 6A, the mechanical dampening mechanism can include one or more cables 626, 628 (two are shown in solid and dotted line) disposed proximate to ends of the lead screw 604 and the guide rail 606. In this embodiment, the cables 626, 628 can either wind or unwind during a dynamic event, serving to slow or counteract motion of the nut assembly 608 to avoid having the nut assembly 608 impact the ends of the lead screw 604 and guide rail 606 when sliding. For example, the cables 626, 628 can be engaged under high torque conditions, or the cables 626, 628 can be designed with a predetermined amount of unwinding or stretching that occurs before stopping movement of the nut assembly 608.

Referring to FIG. 6B, the mechanical dampening mechanism can include one or more springs 630, 632 (two are shown) disposed proximate to ends of the lead screw 604 and the guide rail 606. In this embodiment, the springs 630, 632 can compress or expand during a dynamic event, serving to slow or counteract motion of the nut assembly 608 to avoid having the nut assembly 608 impact the ends of the lead screw 604 and guide rail 606 when sliding. In another example, the springs 630, 632 can be coupled to bumpers or electromagnetic components in order to combine mechanical and electromagnetic dampening means (not shown).

Figure 7:
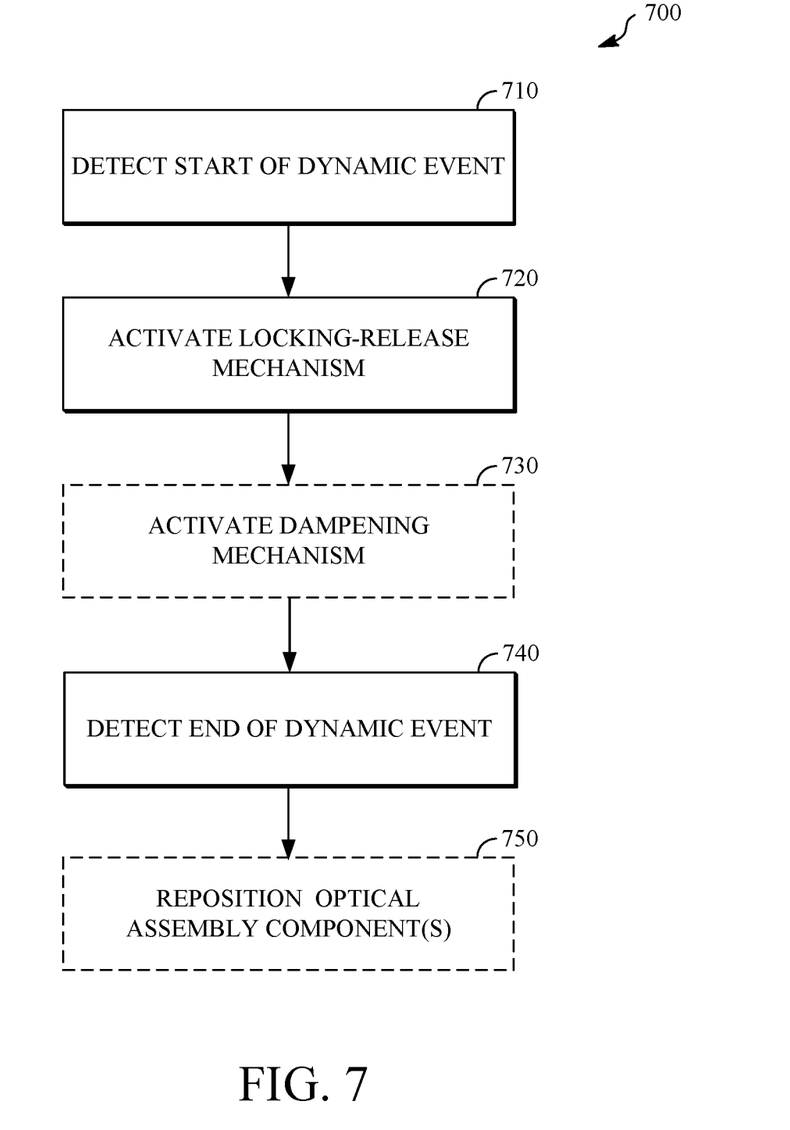
FIG. 7 is a flowchart depicting a process of operation for an actuator disposed within a head-mounted display similar to the head-mounted display of FIG. 1.

FIG. 7 is a flowchart depicting a process 700 of operation for an actuator similar to the actuators 200, 300, 400, 500, 600 of FIGS. 2A, 2B, 3A, 3B, 4A, 4B, 5A, 5B, 6A, and 6B disposed within a head-mounted display similar to the head-mounted display 100 of FIG. 1.

At 710, the process 700 includes detecting a start of a dynamic event, for example, using a sensor such as a position sensor, an accelerometer, an inertial measurement unit, or other sensor within or associated with the head-mounted display. The dynamic event can include events such as shaking, jostling, dropping, impacting, or otherwise handling the head-mounted display in a manner that leads to forces above a disengagement threshold being exerted upon components of the actuator and optical components of an optical assembly.

At 720, the process 700 includes activating a locking-release mechanism such as the locking-release mechanisms described in reference to the actuators 200, 300, 400. The locking-release mechanism can be activated in accordance with detection of the start of the dynamic event, for example, based on or associated with detection of the start of the dynamic event. The locking-release mechanism can modify operation of the movement mechanism within the associated actuator. The movement mechanism can include a lead screw and a nut assembly or a torsion assembly. Modifying operation of the movement mechanism can include disengaging the nut assembly (e.g., the nut assemblies 208, 308) or the torsion assembly (e.g., the torsion assembly 408) from the lead screw (e.g., the lead screws 204, 304, 404).

At 730, shown in dotted line to represent its optional nature, the process 700 includes activating a dampening mechanism such as the dampening mechanisms described in reference to the actuators 500, 600. The dampening mechanism can be activated in accordance with detection of the start of the dynamic event. In another example, the dampening mechanism can be activated in accordance with detected motion of the movement mechanism that surpasses a predetermined threshold speed or distance, indicating that a dynamic event is ongoing. The dampening mechanism can include electromagnetic components susceptible to attraction or repulsion or mechanical components such as springs and cables.

At 740, the process 700 includes detecting an end of the dynamic event, for example, using a sensor such as a position sensor, an accelerometer, an inertial measurement unit, or other sensor within or associated with the head-mounted display. The end of the dynamic event can also be detected based on detecting arrested motion of components within a movement mechanism that were previously in motion during the dynamic event.

At 750, shown in dotted line to represent its optional nature, the process 700 includes adjusting a position of an optical component within an optical assembly to a pre-dynamic event position. The movement mechanism can be used to move, for example, a nut assembly or a torsion assembly within an actuator from its current post-dynamic event position to the pre-dynamic event position. Movement of the optical component is tied to movement of the movement mechanism in this example. Repositioning supports improved function of the overall head-mounted display as the user will not be required to readjust optical components within optical assemblies after a dynamic event.

Figure 8:
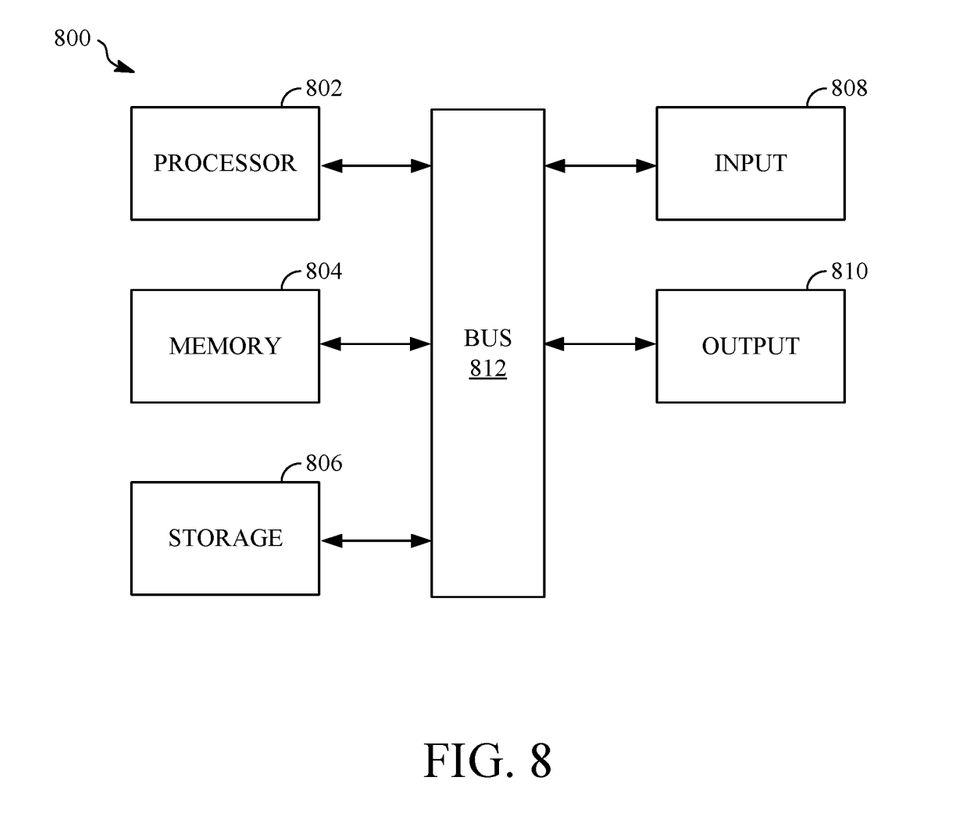
FIG. 8 is a schematic hardware configuration for a controller in the head-mounted display of FIG. 1.

FIG. 8 shows an example of a hardware configuration for a controller 800 that may be used to implement portions of the head-mounted display 100. In the illustrated example, the controller 800 includes a processor 802, a memory device 804, a storage device 806, one or more input devices 808, and one or more output devices 810. These components may be interconnected by hardware such as a bus 812 that allows communication between the components.

The processor 802 may be a conventional device such as a central processing unit and is operable to execute computer program instructions and perform operations described by the computer program instructions. The memory device 804 may be a volatile, high-speed, short-term information storage device such as a random-access memory module. The storage device 806 may be a non-volatile information storage device such as a hard drive or a solid-state drive. The input devices 808 may include sensors and/or any type of human-machine interface, such as buttons, switches, a keyboard, a mouse, a touchscreen input device, a gestural input device, or an audio input device. The output devices 810 may include any type of device operable to provide an indication to a user regarding an operating state, such as a display screen, a light-control panel, or an audio output.

In general, a physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone).

The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources, such as from the sensors 112 or user profiles, to improve the delivery to users of content associated with the head-mounted display 100. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based delivery of content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be displayed to users by inferring preferences based on non-personal information data or a bare minimum amount of personal information, such as the content being requested by the device associated with a user, other non-personal information available to the device, or publicly available information.

What is claimed is:

1. A head-mounted display, comprising:
an optical assembly; and
an actuator, comprising:
   a movement mechanism configured to adjust a position of an optical component within the optical assembly, wherein the movement mechanism comprises a lead screw and a nut assembly, the nut assembly configured to translate along the lead screw based on rotation of the lead screw;
   a locking-release mechanism configured to disengage a portion of the movement mechanism upon detection of a dynamic event, wherein the locking-release mechanism includes a spring that linearly biases the nut assembly against the lead screw, and wherein disengagement of the portion of the movement mechanism includes a portion of the nut assembly being disengaged from the lead screw; and
   a dampening mechanism configured to control positional changes of the optical component during the dynamic event.

2. The head-mounted display according to claim 1, wherein the movement mechanism is configured to adjust the position of the optical component within the optical assembly to a pre-dynamic event position in accordance with detection of an end of the dynamic event.

3. The head-mounted display according to claim 1, wherein the nut assembly comprises separable first and second portions, wherein the spring linearly biases one of the first and second portions of the nut assembly against the lead screw, and wherein disengagement of the portion of the nut assembly includes one of the first and second portions of the nut assembly being disengaged from the lead screw.

4. The head-mounted display according to claim 1, wherein the dampening mechanism comprises an electromagnetic component configured to generate attraction between the nut assembly and the lead screw during the dynamic event.

5. The head-mounted display according to claim 1, wherein the dampening mechanism comprises an electromagnetic component configured to repel the movement mechanism from end portions of the actuator during the dynamic event.

6. The head-mounted display according to claim 1, wherein the dampening mechanism comprises a spring or cable configured to restrict motion of the movement mechanism during the dynamic event.

7. A method, comprising:
detecting, using a sensor in a head-mounted display, a start of a dynamic event;
in accordance with detection of the start of the dynamic event and using a locking-release mechanism, disengaging a portion of a movement mechanism, wherein the movement mechanism is configured to adjust a position of an optical component within an optical assembly of the head-mounted display;
detecting, using the sensor in the head-mounted display, an end of the dynamic event; and
in accordance with detection of the end of the dynamic event and using the locking-release mechanism and the movement mechanism, reengaging the portion of the movement mechanism and adjusting the position of the optical component within the optical assembly to a pre-dynamic event position.

8. The method of claim 7, comprising:
in accordance with detection of the start of the dynamic event and using a dampening mechanism, controlling positional changes of the movement mechanism during the dynamic event.

9. The method of claim 8, wherein the dampening mechanism comprises an electromagnetic component configured to repel components within the movement mechanism during the dynamic event.

10. The method of claim 8, wherein the dampening mechanism comprises an electromagnetic component configured to cause attraction between components within the movement mechanism during the dynamic event.

11. The method of claim 8, wherein the dampening mechanism comprises a spring or cable configured to restrict motion of the movement mechanism during the dynamic event.

12. The method of claim 7, wherein the movement mechanism comprises a lead screw and a nut assembly, wherein the nut assembly is configured to translate along the lead screw based on rotation of the lead screw, and wherein the nut assembly comprises separable first and second portions.

13. The method of claim 12, wherein the locking-release mechanism includes a spring that linearly biases one of the first and second portions of the nut assembly against the lead screw, and wherein disengaging the portion of the movement mechanism includes one of the first and second portions of the nut assembly being disengaged from the lead screw.

14. The method of claim 7, wherein the movement mechanism comprises a lead screw and a plate, and wherein the plate is configured to translate along the lead screw based on rotation of the lead screw.

15. The method of claim 14, wherein the locking-release mechanism includes a spring that torsionally biases the plate against the lead screw, and wherein disengaging the portion of the movement mechanism includes the plate being disengaged from the lead screw.

16. An actuator, comprising:
a movement mechanism configured to adjust a position of an optical component within an optical assembly of a head-mounted display, the movement mechanism comprising:
a lead screw; and
a threaded component, wherein the threaded component is configured to translate along the lead screw based on rotation of the lead screw;
a locking-release mechanism configured to modify operation of the movement mechanism upon detection of a dynamic event, the locking-release mechanism comprising:
a spring configured to bias the threaded component against the lead screw,
wherein modified operation of the movement mechanism includes the threaded component being disengaged from the lead screw; and
a dampening mechanism configured to control positional changes of the movement mechanism during the dynamic event.

17. The actuator of claim 16, wherein the dampening mechanism comprises an electromagnetic component configured to generate attraction between the threaded component and the lead screw during the dynamic event.

18. The actuator of claim 16, wherein the dampening mechanism comprises an electromagnetic component configured to repel the movement mechanism from end portions of the actuator during the dynamic event.

19. The actuator of claim 16, wherein the dampening mechanism comprises a spring or cable configured to restrict motion of the movement mechanism during the dynamic event.

20. The actuator of claim 16, wherein the movement mechanism is configured to adjust the position of the optical component within the optical assembly to a pre-dynamic event position in accordance with detection of an end of the dynamic event.

* * * * *